United States Patent [19]

Thorland

[11] Patent Number: 5,311,538
[45] Date of Patent: May 10, 1994

[54] CASE-MOUNTED RLG READOUT HAVING BLOCK MOUNTED OPTICAL SENSOR

[75] Inventor: Rodney H. Thorland, Shoreview, Minn.

[73] Assignee: Honeywell Inc., Minneapolis, Minn.

[21] Appl. No.: 986,954

[22] Filed: Dec. 8, 1992

[51] Int. Cl.⁵ .............................................. H01S 3/083
[52] U.S. Cl. ........................................................ 372/94
[58] Field of Search ........................... 372/94, 99, 103

[56] References Cited

U.S. PATENT DOCUMENTS

| | | |
|---|---|---|
| 3,373,650 | 4/1965 | Killpatrick . |
| 4,582,429 | 4/1986 | Callaghan . |
| 4,632,555 | 12/1986 | Malvern ................................ 372/94 |
| 4,637,723 | 1/1987 | Egli et al. ............................. 372/94 |
| 4,712,917 | 12/1987 | Bergstrom et al. . |
| 4,783,170 | 11/1988 | Bergstrom . |
| 4,973,161 | 11/1990 | Simms ................................... 372/94 |
| 5,173,745 | 12/1992 | Hause ..................................... 372/94 |

Primary Examiner—Rodney B. Bovernick
Assistant Examiner—Robert E. Wise
Attorney, Agent, or Firm—Craig J. Lervick

[57] ABSTRACT

A readout device is provided for use in a ring laser angular rate sensor assembly which has improved low rate performance. Low rate performance is improved by reducing sources of backscatter thus not allowing light to be reflected back into the optical signal carrying medium. Backscatter is reduced by placing the optical sensors directly upon the gyro output mirror, thus causing the optical sensors to be dithered along with the laser block. By dithering the optical sensors, any backscatter caused by these elements is dealt with by dithering. While the optical sensors are dithered, the readout apparatus continues to utilize the advantages of a case mounting.

19 Claims, 4 Drawing Sheets

CASE-MOUNTED RLG READOUT HAVING BLOCK MOUNTED OPTICAL SENSOR

BACKGROUND OF THE INVENTION

The present invention relates to readout devices for use in ring laser angular rate sensors. The present invention provides a readout device that displays improved performance at low input rates.

Ring laser angular rate sensors or ring laser gyroscopes are fairly well known in the field of angular rate sensing. Examples of ring laser gyroscopes are shown in U.S. Pat. No. 3,373,650 which is assigned to the assignee of the present invention. In summary, two counter propagating light beams are maintained within a closed loop path to form a rotation sensing device. Rotation of this device around an axis which is normal to a plane containing the closed loop path causes the relative path lengths in either direction to change. Detections of these changes in path length can be used to measure the rate of rotation.

A common problem occurs when the angular rate sensors are rotated at a very low rate. If the angular rate sensor is held still in inertial space for a period of time the counter propagating light beams tend to resonate together or "lock-in". once the two beams lock-in to one another it is then not possible to detect differences in relative path length.

In order to avoid lock-in the angular rate sensor is rotationally oscillated or dithered. If the readout signal is averaged over a period of time the average rotation rate of the oscillation signal is zero. Therefore this oscillation or dither will not affect the sensitivity of the gyro. The dither signal or rotational oscillation of the ring laser gyroscope can be removed from the output signal by either geometrically eliminating the affects of this oscillation or electronically removing the dither signal. To eliminate the dithering geometrically the optical elements making up the readout must be appropriately placed. Once appropriately placed the change in path length due to dithering is cancelled out by the scale factor of the gyroscope.

To accomplish geometric removal of the dither signal or "dither stripping" some of the optic elements making up the readout device must not be connected to the laser block itself. Therefore, during dithering the laser block itself is rotationally oscillated while the readout optics are not.

Numerous readouts are traditionally placed on the ring laser angular rate sensor to perform numerous other functions. An example of these functions are laser intensity sensing to assure the optical signals within the ring laser angular rate sensor are resonating at a sufficiently strong level.

Backscattering also effects the performance of the gyro. Specifically, the low-rate linearity is detrimentally affected by backscattering.

One source of lock-in is backscattering. Backscattering occurs when the optical signal propagating in one direction within the ring laser gyro is scattered back into the gyro but in the opposite direction. Backscattering can be due to sources within the laser cavity or sources outside the laser cavity. Since it is desirable that the optical signals within the ring laser gyro oscillate independently at their particular frequencies, backscatter is detrimental as it causes an unwanted coupling influence between the two optical signals. Gyro dither is effective in mitigating the effect of scatter sources that oscillate along with the gyro block, however dithering is not effective in mitigating the effects of case mounted components. There are numerous sources of back scattering including the readout optics used, optical sensors attached to the laser gyro or the gyro case, and even the laser gyro case itself.

Referring now to FIG. 1 there is shown a prior art readout system. A laser block 10 contains a number of tunnels or bores 12 which create a closed loop path within laser block 10. Bores 12 carry the optical signals which make up the angular rate sensor. Upon one corner of laser block 10 there is an output mirror 14 which is partially reflective and partially transmissive. Output mirror 14 allows a portion of the optical signals within laser block 10 to be transmitted through output mirror 14 while another portion of the optical signals is reflected back into the adjoining bore 12. Shown as lines on FIG. 1 are a counter clockwise signal or CCW signal 20 and a clockwise signal or cw signal 22. While FIG. 1 represents only one corner of the ring laser gyro it is understood that the gyro block 10 makes up a closed loop path with mirrors on the corners of the closed loop path. CCW signal 20 is transmitted through output mirror 14 and toward a corner cube 16 which is mounted to the gyro case (not shown). Corner cube 16 causes CCW signal 20 to be translated and reflected back towards output mirror 14. Upon meeting an upper surface 24 of output mirror 14 CCW signal 20 is reflected off surface 24 and directed onto an optical sensor 18. Meanwhile, CW signal 22 is transmitted through output mirror 14 and directly onto optical sensor 18. Optical sensor 18 receives a combination of CCW signal 20 and CW signal 22. Those skilled in the art will recognize that this combination of these two signals can be used to detect rotation.

In summary, the effects of dithering are cancelled out by the scale factor of the gyro. Dithering causes a change in the path lengths of the optical signals. This change in path length is then designed to be exactly cancelled out by the gyro scale factor. However, changes in path length due to common rotation of both the gyro block 10 and the gyro case will still be detected.

SUMMARY OF THE INVENTION

It is an object of the present invention to produce a ring laser gyroscope having improved low rate performance. The low rate performance is improved by reducing backscatter sources mounted to the gyro case. Furthermore, it is another object of the present invention to provide a readout sensor system having a pair of optical sensors.

The present invention increases low rate performance by placing the optical sensors directly on the output mirror. Low rate performance is improved by reducing the sensitivity to backscattering from components.

A laser block is utilized with an output mirror on one corner thereof. The output mirror allows the optical signals to be transmitted therethrough. One of the signals will then encounter a corner cube reflecting means which will cause the signal to be translated and reflected back towards the output mirror. This optical signal is then allowed to be transmitted through the upper surface of the output mirror and reflect off a lower surface of the output mirror. Upon reflection off the lower surface of the output mirror, this optical signal is then directed onto an optical sensor, which is attached to the output mirror.

The alternate optical signal collides with a lower surface of the output mirror thus allowing a portion of this optical signal to be reflected while a second portion is allowed to be transmitted into the output mirror. When this second optical signal intersects with the upper surface of the output mirror it is reflected off of this upper surface and back down toward the lower surface of the output mirror. Upon intersecting with the lower surface of the output mirror the second optical signal is reflected back towards the optical sensor, which is attached to the output mirror.

In the present invention the optical sensors mounted directly on the upper surface of the output mirror. Backscatter due to the optical sensors is dealt with by dithering. Since the sensors are directly attached to the laser block, the sensors will be dithered along with the block.

In order to further deal with sources of backscatter, a baffle is placed in direct line with the second optical signal. The baffle is also mounted to the output mirror, and consequently will be dithered along with the laser block. Backscatter caused by the baffle is thus dealt with by dithering.

BRIEF DESCRIPTION OF THE DRAWINGS

A preferred embodiment will now be described with continual reference to the attach figures in which like reference numbers refer to like elements.

Further objects and advantages of the present invention can be seen by reading the following detailed description of the invention in conjunction with the attached drawing in which:

FIG. 3 illustrates the readout system of the present invention having the optical sensors placed directly on the output mirror, wherein

DETAILED DESCRIPTION OF THE INVENTION

Figure 1:
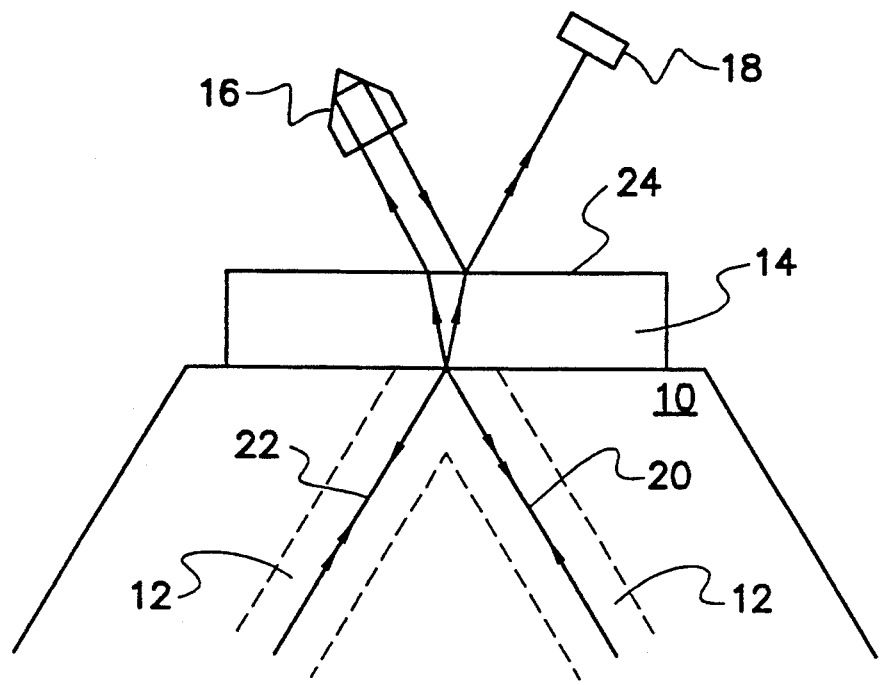
FIG. 1 illustrates a prior art readout system.
Figure 2:
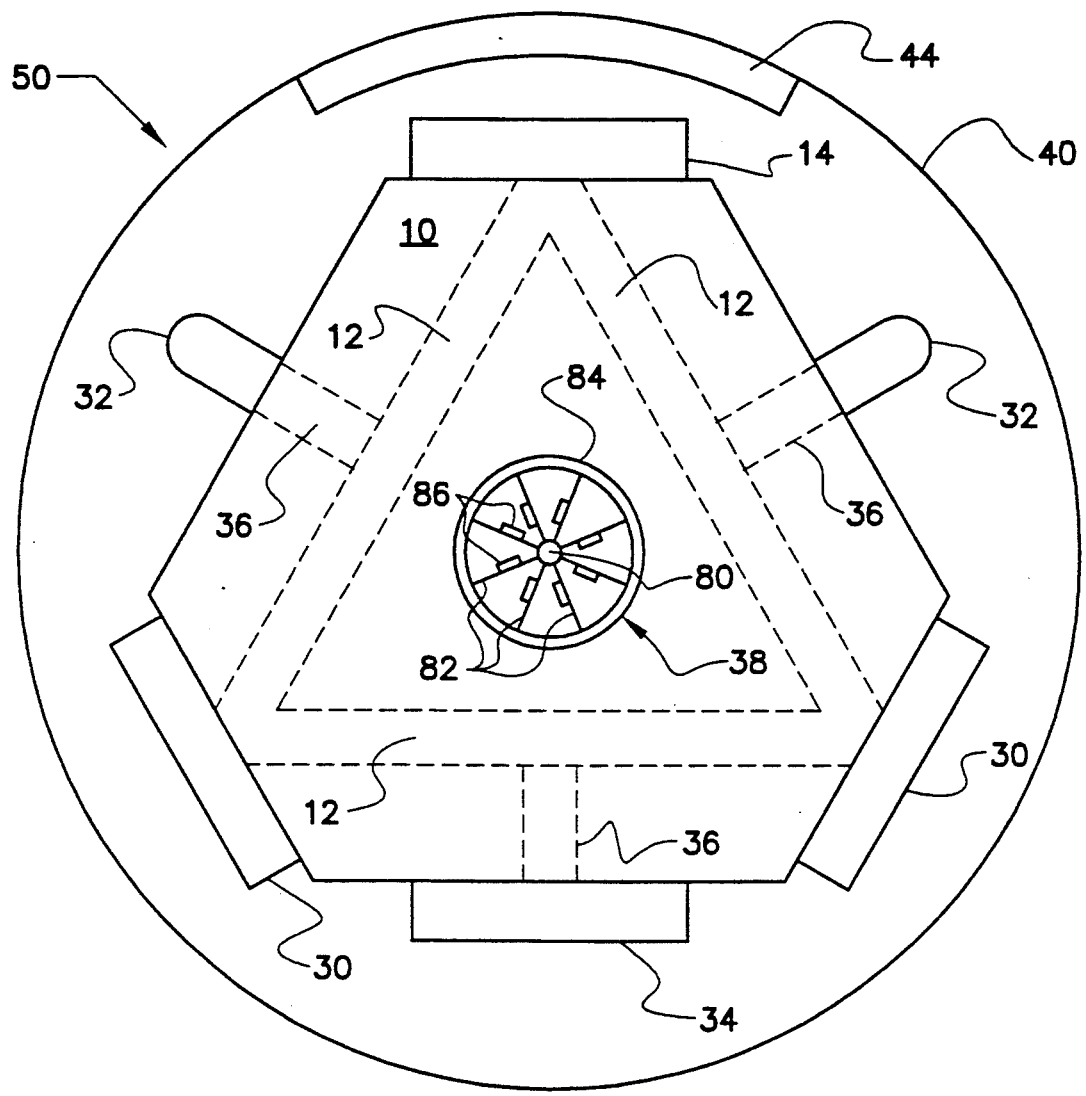
FIG. 2 illustrates the elements making up an operating ring laser gyro system.

Referring now to FIG. 2 there is shown a ring laser gyroscope 50 which operates in accord with the principles of the present invention. Gyroscope 50 has a laser block 10 having a polygonal configuration. The laser block 10 of the present embodiment is configured in a substantially triangular shape. Laser block 10 again has a plurality of bores 12 for carrying the optical signals used to detect rotation. Bores 12 extend to connect at each corner of laser block 10. Upon two corners of laser block 10 are corner mirrors 30. On a third corner of laser block 10 is output mirror 14. Output mirror 14 is a partially reflective mirror allowing a portion of an optical signal to be reflected off of the surface of the mirror while a second portion of the signal is transmitted through output mirror 14. In the preferred embodiment the output mirror is nearly totally reflective, however, a small portion of the optical signals is transmitted therethrough. Output mirror 14 and corner mirrors 30 are used to cause an optical signal to be reflected around the closed loop path created by bores 12.

Bores 12 contain an active gas to allow the creation of a gas discharge laser. Lasing is assisted by a pair of anodes 32 and cathode 34. Cathode 32 and anodes 34 are in communication with bores 12 via communication bores 36. By applying an electrical potential between cathode 34 and anodes 32 a gas discharge laser is created within bores 12 creating light beams which travel around the closed loop path created by bores 12.

To eliminate the problems of lock-in and to further improve performance, the ring laser gyro of the present invention is rotationally oscillated or dithered. This dithering is done by a dither means 38 which causes laser block 10 to be rotationally oscillated about its central axis. Many methods of dithering are available, however in the preferred embodiment dithering is accomplished through a spoke and hub structure. A central post 80 is attached to gyro case 40. Extending radially outward from central post 80 are a plurality of spokes 82. Attached to spokes 82, at the end opposite central post 80 is an outer ring 84. Outer ring 84 is attached to laser block 10. Dithering is achieved by energizing a plurality of piezoelectric element 86 which are attached to spokes 82.

Laser block 10 and dither means 38 are contained within a mounting case 40. Dither means 38 causes laser block 10 to be rotationally oscillated with respect to case 40.

Figure 3A:
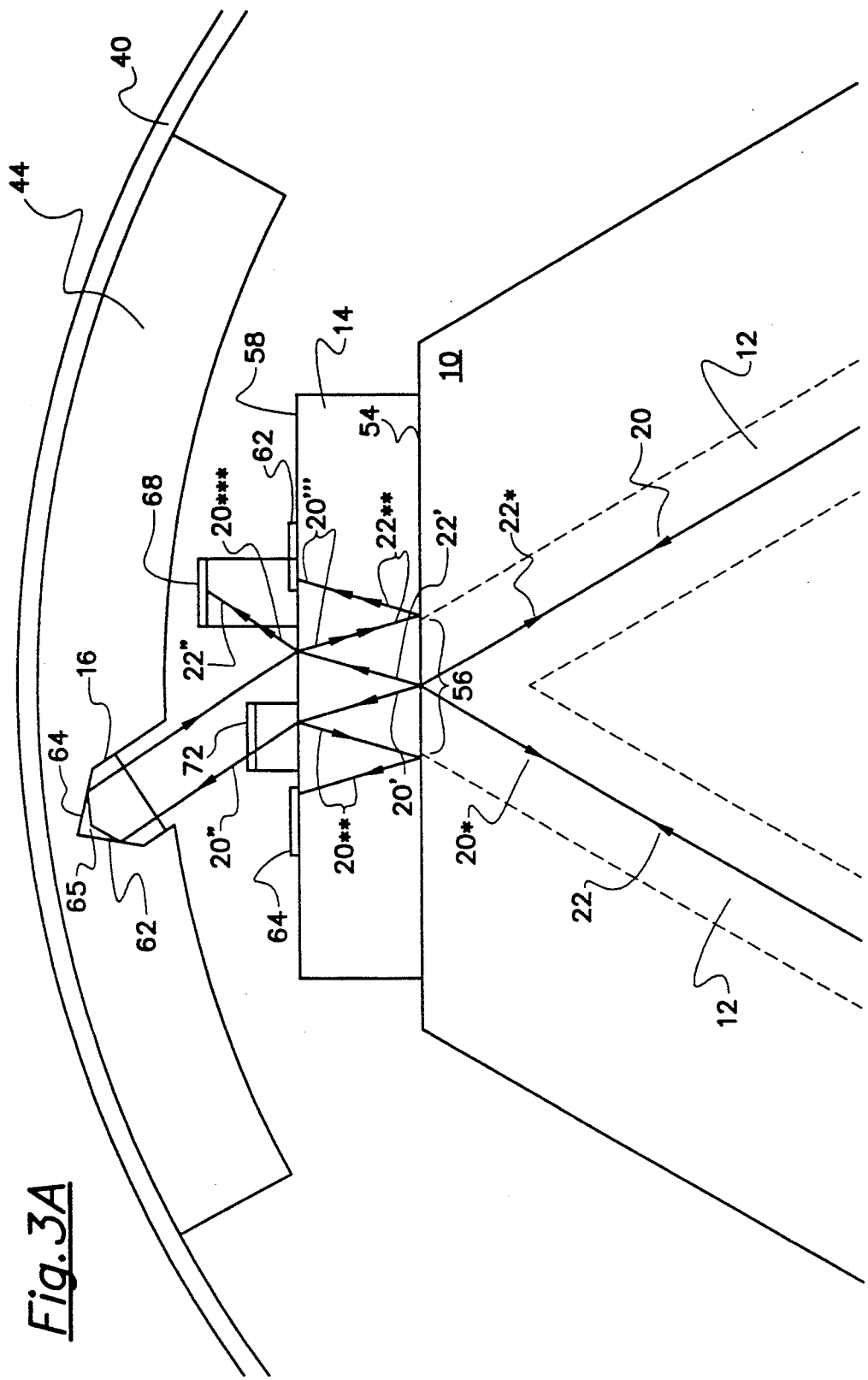
FIG. 3a is a front view and FIG. 3b is a side view.
Figure 3B:
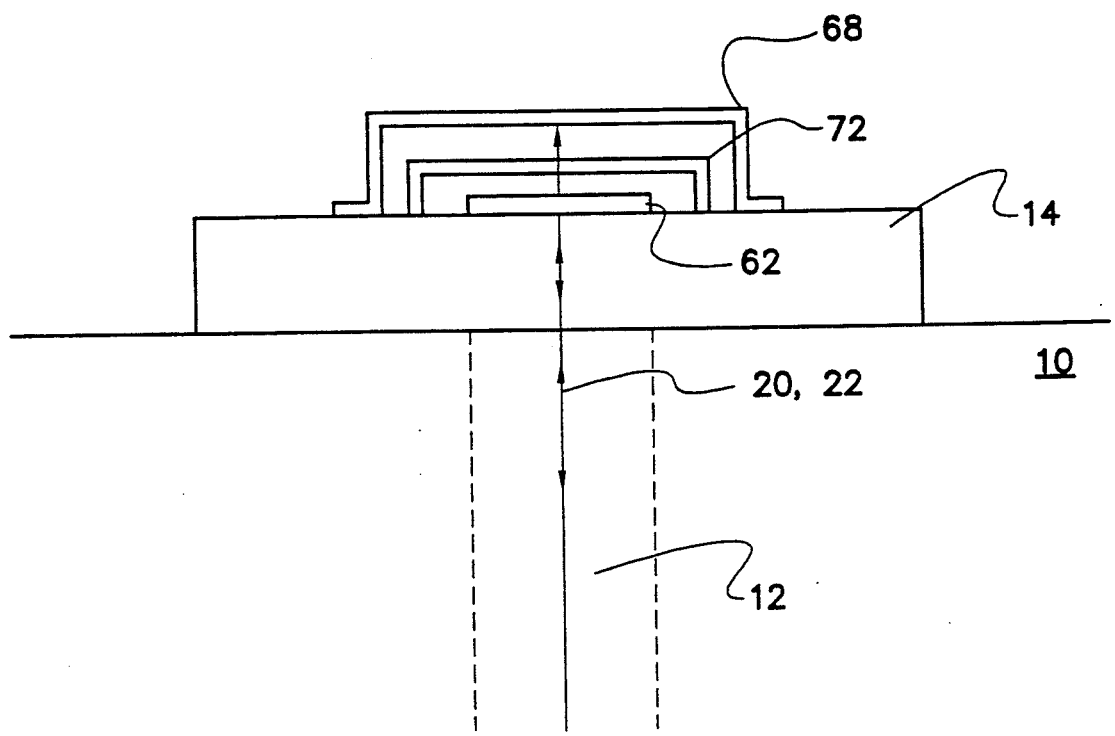

Attached to case 40 and aligned directly behind output mirror 14 is a readout assembly 44 for sensing the optical signals propagating within laser block 10 and measuring rotation of the entire laser gyro assembly 50. Referring now to FIG. 3a and FIG. 3b there is shown a more detailed drawing of readout assembly 44 and output mirror 14. As previously mentioned output mirror 14 is attached to laser block 10 at one corner. Output mirror 14 has two partially reflective surfaces. A first partially reflective surface 54 is positioned directly upon laser block 10 and aligned to be over an opening 56 which opens into bores 12. First partially reflective surface 54 receives both CCW signal 20 and CW signal 22 from within bores 12. CCW signal 20 and CW signal 22 strike first surface 54 at common point. First partially reflective surface 50 causes a portion of each optical signal 20', 22' to be transmitted through first surface 54 into output mirror 14 while a second portion of optical signals 22* and 24* are reflected back into the laser cavity. Output mirror 14 is connected directly to laser block 10 and forms an gas tight seal over opening 56.

Generally, in order to detect rotation of laser gyro assembly 50 it is necessary that the optical signals 20 and 22 be combined to form an interference pattern. Then it is necessary to project this interference pattern upon an optical sensor. The optical sensor then creates electrical signals corresponding to the interference pattern. The electrical signal can be interpreted to provide information indicative of rotation.

To combine CCW signal 20 and CW signal 22 it is necessary to make use of both first partially reflective surface 54 and a second partially reflective surface 58 which are on opposite surfaces of output mirror 14. As mentioned, a portion 20' of CCW signal 20 is transmitted through first surface 54 and into output mirror 14. CCW signal 20' then intersects with second partially reflective surface 58 and a portion 20" or is transmitted therethrough. From second partially reflective surface 58, the transmitted portion 20" of CCW signal 20 is transmitted towards a corner cube 16. The corner cube 16 is used to translate proportional CCW signal 20" and reflected it back towards second partially reflective surface 58.

Corner cube 16 is mounted in readout assembly 44. Readout assembly 44 is then mounted to case 40. By mounting corner cube 16 to the case, the readout apparatus continues to use the advantages of case mounting. Specifically, dither stripping is achieved through proper geometric alignment. Corner cube 16 has three reflective surfaces, a first reflective surface 62, a second reflective surface 64 and a third reflective surface 65. Reflective surfaces 62, 64 and 65 are positioned so as to translate and reflect CCW signal 20 back towards second partially reflective surface 58 of output mirror 14. In the preferred embodiment of the present invention, corner cube 16 is a prism configured to cause the appropriate reflections. Those skilled in the art will recognize that corner cube 16 could alternatively be made up simply of three mirrors 62, 64, and 65 which are appropriately aligned.

After reflection off of corner cube 16, proportional CCW signal 20" then intersects with second partially reflective surface 58. Again, a portion 20*** of ccw signal 20 is reflected off of second partially reflective surface 58 while a second portion 20''' of CCW signal 20 is transmitted through partially reflective surface 58. The portion 20''' of CCW signal 20 that is transmitted through second partially reflective surface 58 travels through output mirror 14 and intersects with first partially reflective surface 54. At this point, surface 54 is nearly totally reflective which causes this portion 20''' of CCW signal 20 to be reflected back up towards second surface 58.

Looking now at CW signal 22, this signal intersects with first surface 54 and a portion 22* thereof is caused to be reflected off of surface 54 while a second portion 22' is caused to be transmitted therethrough. The portion 22' of CW signal 22 transmitted through first surface 54 then intersects second surface 58 where again, a portion 22 of CW signal 22 is caused to be reflected off of surface 58 while a second portion 22'' is caused to be transmitted therethrough. Proportional CW signal 22 is reflected off second surface 58 and back toward first surface 54. Again, the point at which proportional CW signal 22 intersects first surface 54 is totally reflective, therefore proportional CW signal 22 is totally reflected. Aligned to receive reflected proportional CW signal 22** is optical sensor 62.

The point at which proportional CW signal 22' intersects with second surface 58 is aligned to be the same point at which proportional CCW signal 20" intersects with second surface 58 after being transmitted out of corner cube 16. Proportional signal 20''' and proportional signal 22 are propagate through output mirror 14 and are reflected of first surface 54. Upon reflection off first surface 54 these signals 20''' and 22 are projected onto a first optical sensor pair or first optical sensor means 62. Since first optical sensor means 62 receives a combination of both proportional CW signal 22** and proportional CCW signal 20", this sensor can be used to detect rotation of laser gyro assembly 50 using standard principles in the field of optics.

Referring again to proportional CCW signal 20', when proportional CCW signal 20' first intersects with second surface 58 a portion of that signal 20 is caused to be reflected back into output mirror 14. Signal 20 then encounters first surface 54 again and is reflected back into output mirror 14 from first surface 54. Positioned upon second surface 54 is a second optical sensor pair or second optical sensor means 64 which is positioned to receive a portion 20** of CCW signal 20. This sensor can then be used to detect the intensity of CCW signal and other information involving the optical signals within the laser block cavity 13.

Both first optical sensor means 62 and second optical sensor means 64 are mounted directly upon second surface 58 of output mirror 14. Mounting these optical sensors in these positions results in any backscatter from the sensor to be dithered and thus increases the low rate performance of laser gyro assembly 50. As mentioned before first optical sensor means 62 receives a combination of proportional CW optical signal 22** and proportional CCW optical signal 20'''.

As is well known in the art while laser gyro assembly 50 is held still in inertial space CW optical signal 22 and CCW signal optical 20 resonate within laser gyro cavity at an equivalent frequency. However, rotation of laser gyro assembly 50 causes the relative path length of the optical signals to change and thus causes a difference in the resonant frequencies. This difference in resonant frequencies creates an interference pattern when the two optical signals are combined. This interference pattern is projected onto first optical sensor means 62 which can then produce electrical signals indicative of the interference pattern. Due to the alignment of first optical sensor means 62, the combined optical signals 20 and 22 are received at an angle in relation to the surface of first optical sensor means 62. By placing first optical sensor means 62 at this angle, any backscatter from the first optical sensor means 62 is further reduced.

Second optical sensor means 64 is aligned and configured to receive a single optical signal. As with first optical sensor means 62, second optical sensor means 64 is positioned to receive an optical signal 20** at an angle to the readout surface thereof. Again, due to this angle the possibility that the optical signal received on second optical sensor means 64 can be reflected back into the laser gyro cavity is reduced Both first optical sensor means 62 and second optical sensor means 64 are attached to the laser block 10 via output mirror 14. Optical sensor means 62 and 64 are dithered along with laser block 10. Therefore, any backscatter from first optical sensor means 62 and second optical sensor means 64 is dealt with by dithering.

Baffle 68 is also attached to output mirror 14 and is positioned to receive a combination of proportional CCW signal 20* and proportional CW signal 22''. Baffle 68 is made of an optically absorptive material and is used to eliminate the possibility of either optical signal 20* or 22'' being reflected back into laser gyro cavity. Furthermore, since baffle 68 is attached to output mirror 14, baffle 68 is dithered along with block 20. Backscatter from this source is thus also dealt with by dithering.

Also attached to output mirror 14 is a filter 72. Filter 72 is a quarter wave plate used for scatter blocking. As with baffle 68, filter 72 is attached to output mirror and consequently is dithered along with laser block 10. Therefore, backscatter caused by filter 72 is dealt with by being dithered.

Those skilled in the art will recognize that the single optical signal can be either CW optical signal 22 or CCW optical signal 20, depending on the particular configuration of the readout assembly. Similarly, a portion of CW signal 22 could be transmitted toward corner cube 16 as opposed to a portion of CCW signal 20.

As previously mentioned the present invention involves a dithered block 10 that is dithered or rotationally oscillated with respect to case 40. This dither motion must be eliminated from the output of laser gyro assembly in order to produce a useful device. Since corner cube 16 is attached to case 40 and not attached to laser block 10, the removal of the affects of dithering is done through geometry. As is well known in the art the change in path length is cancelled by the scale factor of the gyro.

Having illustrated and described the principles of the invention in the preferred embodiment, it should be apparent to those skilled in the art that the invention can be modified in arrangement and detail without departing from such principles. We claim all modifications coming within the scope and spirit of the following claims.

What is claimed is:

1. An angular rate sensor for sensing rotation, comprising:
   a gyro case;
   a block attached to the gyro case, the block having a plurality of bores therein which interconnect to form a closed loop cavity, the block for supporting a first counterpropagating optical signal and a second counter propagating optical signal;
   an output mirror attached to the block having a first partially reflective surface and a second partially reflective surface, the output mirror attached to the block at a point where the first and second counterpropagating optical signals intersect, the output mirror for transmitting the first optical signal through both the first partially reflective surface and the second partially reflective surface;
   a corner cube attached to the gyro case for receiving the first optical signal after it has been transmitted through the output mirror, translating the first optical signal, and reflecting the first optical signal back toward the output mirror; and
   an optical sensor attached to the output mirror for receiving a combination of the first optical signal and the second optical signal and producing an electrical signal indicative of the combined optical signal.

2. The angular rate sensor of claim 1 further comprising a baffle positioned directly behind and mounted to the output mirror to receive and absorb optical signals which contact the baffle.

3. The angular rate sensor of claim 1 wherein the output mirror receives both the first and the second optical signals at a common point and then transmits a portion of the first optical signal to the corner cube and also receives the reflected first optical signal from the corner cube, the reflected first optical signal and the second optical signal are then projected onto the optical sensor which is mounted to the output mirror.

4. The angular rate sensor of claim 1 wherein the block is attached to the gyro case via a dither means for causing the block to be rotationally oscillated with respect to the gyro case.

5. The angular rate sensor of claim 1 further comprising a second optical sensor attached to the output mirror, the second optical sensor positioned to receive a portion of the first optical signal and produce an electrical signal indicative of the first optical signal.

6. The angular rate sensor of claim 1 further comprising a second optical sensor attached to the output mirror, the second optical sensor positioned to receive a portion of the second optical signal and produce an electrical signal indicative of the second optical signal.

7. The angular rate sensor of claim 1 wherein the corner cube is a prism.

8. The ring laser gyro of claim 1 wherein the corner cube has three reflecting mirrors arranged such that an optical signal is received by the corner cube, translated a predefined distance and reflected back in the direction of its origin.

9. A readout device attached to a gyro case for use in a ring laser gyro system which has a laser block attached to the case, the block for supporting two counter propagating light beams, the readout device comprising:
   a corner cube attached to the gyro case for receiving an optical signal, translating that signal and reflecting the signal back in substantially the direction from which it came;
   an optical sensor for receiving optical signals and producing an electrical signal indicative of the received optical signal; and
   an output mirror attached to the laser block for receiving a first optical signal and a second optical signal, the output mirror for partially reflecting the optical signals and for partially transmitting the optical signal&, the output mirror for further transmitting the first optical signal to the corner cube and receiving the first optical signal back from the corner cube and then projecting the first optical signal upon the optical sensor, while also for receiving the second optical signal and projecting the second optical signal upon the optical sensor, wherein the optical sensor is attached to the output mirror.

10. The readout device of the of claim 9 wherein the corner cube is a prism.

11. The angular rate sensor of claim 9 further comprising a second optical sensor attached to the output mirror, the second optical sensor positioned to receive a portion of the first optical signal and produce an electrical signal indicative of the first optical signal.

12. The angular rate sensor of claim 9 further comprising a second optical sensor attached to the output mirror, the second optical sensor positioned to receive a portion of the second optical signal and produce an electrical signal indicative of the second optical signal.

13. The ring laser gyro of claim 9 further comprising a baffle attached to the output mirror for absorbing an portion of the second optical signal that is transmitted through the output mirror and intersects with the baffle.

14. The ring laser gyro of claim 9 wherein the corner cube has three reflecting mirrors arranged to receive an optical signal, translate the optical signal and transmit the optical signal back in the direction of its origin.

15. A ring laser gyro for sensing angular rates, comprising:
   a gyro case;
   dither means attached to the gyro case for producing rotational oscillation with respect to the gyro case;
   a laser block attached to the dither means such that the laser block is rotationally oscillated with respect to the gyro case, the gyro block for supporting two counterpropagating optical signals, the laser block further having a plurality of corners to form a polygonal shape;
   an output mirror attached to the laser block at one of the corners and positioned so as to allow the counterpropagating optical signals to intersect the output mirror at a surface of the output mirror, the output mirror being partially reflective so that a portion of the optical signals is transmitted through the mirror and the remainder of the optical signals is reflected off of the mirror;

a corner cube attached to the gyro case and positioned behind the output mirror to receive one of the optical signals, translate that optical signal and reflect the optical signal back toward the output mirror to combine with the second optical signal; and an optical sensor attached to the output mirror for receiving the combined optical signals and generate an electrical signal indicative of the nature of the combined optical signals.

16. The ring laser gyro of claim 15 further comprising a second optical sensor attached to the output mirror to receive one of the optical signals and produce an electrical signal indicative of the optical signal received.

17. The ring laser gyro of claim 15 further comprising a baffle attached to the output mirror for absorbing an portion of the optical signals that is transmitted through the output mirror and intersects with the baffle.

18. The ring laser gyro of claim 15 wherein the corner cube is a prism.

19. The ring laser gyro of claim 15 wherein the corner cube has three reflecting mirrors arranged to receive an optical signal, translate the optical signal and transmit the optical signal back in the direction of its origin.

* * * * *